United States Patent
Ma et al.

(10) Patent No.: US 11,467,711 B2
(45) Date of Patent: Oct. 11, 2022

(54) SYSTEMS AND METHODS FOR DISPLAYING AND ASSOCIATING CONTEXT IMAGES WITH ZONES OF A SECURITY SYSTEM

(71) Applicant: Ademco Inc., Golden Valley, MN (US)

(72) Inventors: Xinyu Ma, Shanghai (CN); Qingqing Zhang, Shanghai (CN); Lu Yuan, Shanghai (CN)

(73) Assignee: Ademco Inc., Golden Valley, MN (US)

( * ) Notice: Subject to any disclaimer, the term of this patent is extended or adjusted under 35 U.S.C. 154(b) by 153 days.

(21) Appl. No.: 15/850,510

(22) Filed: Dec. 21, 2017

(65) Prior Publication Data
US 2019/0196692 A1    Jun. 27, 2019

(51) Int. Cl.
| | |
|---|---|
| *G06F 3/0481* | (2022.01) |
| *G06F 3/0484* | (2022.01) |
| *H04L 12/28* | (2006.01) |
| *G06F 3/04817* | (2022.01) |
| *G08B 13/196* | (2006.01) |

(52) U.S. Cl.
CPC ........ *G06F 3/04817* (2013.01); *G06F 3/0484* (2013.01); *G08B 13/19682* (2013.01); *H04L 12/282* (2013.01); *G08B 13/19697* (2013.01); *H04L 2012/2847* (2013.01)

(58) Field of Classification Search
CPC . G06F 3/04817; G06F 3/0484; H04L 12/282; H04L 2012/2847; G08B 13/19682; G08B 13/19697
USPC ........................................................ 715/700
See application file for complete search history.

(56) References Cited

U.S. PATENT DOCUMENTS

| | | | |
|---|---|---|---|
| 2004/0257336 A1 | 12/2004 | Hershkovitz et al. | |
| 2013/0282180 A1 | 10/2013 | Layton | |
| 2014/0195952 A1 | 7/2014 | Champagne et al. | |
| 2014/0267112 A1* | 9/2014 | Dunn | G08B 13/19689 345/173 |
| 2015/0193127 A1* | 7/2015 | Chai | G08B 13/19645 715/719 |
| 2016/0005280 A1* | 1/2016 | Laska | G08B 13/19682 386/230 |
| 2016/0364129 A1* | 12/2016 | McLean | G06F 3/0481 |
| 2017/0220242 A1 | 8/2017 | Dunn et al. | |

(Continued)

FOREIGN PATENT DOCUMENTS

EP    3 035 306 A1    6/2016

OTHER PUBLICATIONS

Extended European search report for corresponding EP patent application 18195897.6, dated Nov. 2, 2018.

(Continued)

*Primary Examiner* — Tadesse Hailu
*Assistant Examiner* — Darrin Hope
(74) *Attorney, Agent, or Firm* — Fredrikson & Byron, P.A.

(57) ABSTRACT

Systems and methods for displaying and associating context images with zones or devices of a security system or a home automation system are provided. Such systems and methods may include associating each of a plurality of zones or devices of the security system or the home automation system with a respective context image and displaying the respective context image for one of the plurality of zones or devices in response to a user interface of the security system or the home automation system receiving user input.

20 Claims, 3 Drawing Sheets

(56) References Cited

U.S. PATENT DOCUMENTS

2018/0018081 A1* 1/2018 Dattilo-Green ....... H04L 67/025
2018/0019889 A1* 1/2018 Burns ................. H04L 12/2807

OTHER PUBLICATIONS

Examination Communication for corresponding EP patent application 18195897.6, dated Mar. 7, 2019.

* cited by examiner

SYSTEMS AND METHODS FOR DISPLAYING AND ASSOCIATING CONTEXT IMAGES WITH ZONES OF A SECURITY SYSTEM

FIELD

The present invention relates generally to control systems and user interfaces of security systems or home automation systems. More particularly, the present invention relates to systems and methods for displaying and associating context images with zones, sensors, and/or devices of a security system or a home automation system.

BACKGROUND

Known systems and methods for controlling devices or zones of a security system or a home automation system display contextless lists of each of the zones or devices for selection by a user. Accordingly, such systems and methods rely on the user's memory from initial setup to associate a desired one of the devices or zones with a textual icon displayed on a system user interface.

In view of the above, there is a continuing, ongoing need for improved systems and methods.

DETAILED DESCRIPTION

Figure 1:
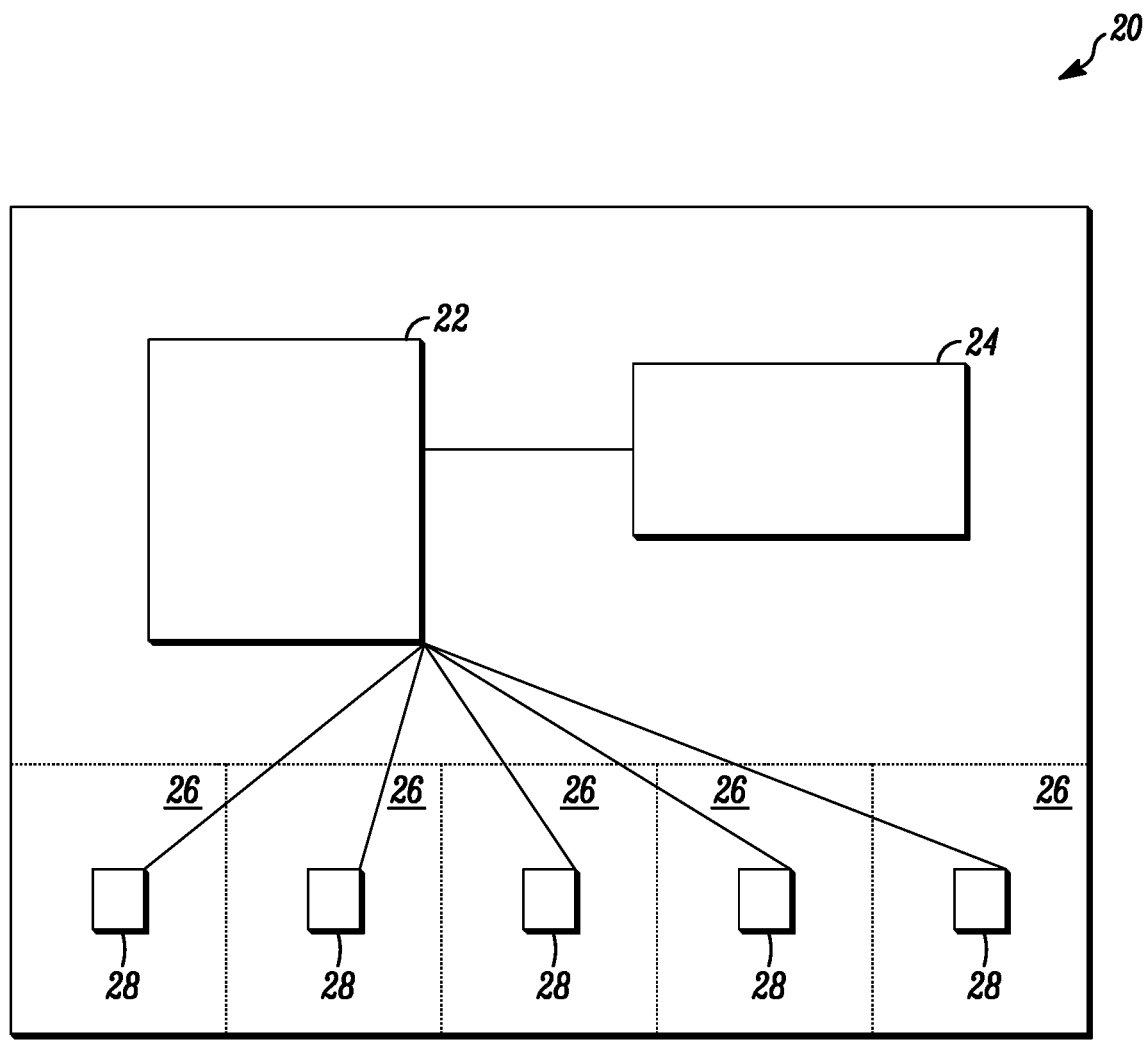
FIG. 1 is a block diagram of a security system or a home automation system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein may include systems and methods for displaying and associating context images with zones or devices of a security system or a home automation system. For example, systems and methods disclosed herein may associate each of a plurality of zones or devices of the security system or the home automation system with a respective context image and display the respective context image for a first of the plurality of zones or devices in response to a user interface of the security system or the home automation system receiving first user input.

Systems and methods as disclosed herein are described in connection with home automation systems and security systems. It is to be understood that such systems may include, but are not limited to systems that include a control panel in communication with the plurality of zones of the security system or the home automations system, the user interface of the control panel, and the devices or sensors coupled to the control panel and located in the plurality of zones of the security system or the home automation system.

In accordance with disclosed embodiments, each of the plurality of zones of the security system or the home automation system may be assigned the respective context image, which may be used to differentiate each of the plurality of zones from each other and facilitate accessing an intended one of the plurality of zones for control purposes, such as adjusting associated settings or activating or deactivating the devices or the sensors associated with the intended one of the plurality of zones. Furthermore, the user interface of the security system or the home automation system may display a list view of a plurality of icons corresponding to at least some of the plurality of zones of the security system or the home automation system. For example, in some embodiments, the plurality of icons may include a respective textual indicator associated with each of the plurality zones, and the respective textual indicator of a respective one of the plurality of zones may describe functions of the devices and the sensors operating in connection with the respective one of the plurality of zones (e.g. window break sensor, motion sensor, temperature control, volume control, light level, etc.). In accordance with disclosed embodiments, the user interface may receive the first user input to select a first of the plurality of icons corresponding to the first of the plurality of zones and, responsive thereto, display the respective context image for the first of the plurality of zones.

In some embodiments, systems and methods disclosed herein may limit displaying the respective context image for the first of the plurality of zones responsive to when the first user input is a first preprogrammed or preconfigured input type. These embodiments may prevent displaying the respective context image when not desired by a user, such as when the user recognizes the first of the plurality of zones from the respective textual indicator associated with the first of the plurality of zones alone.

In some embodiments, the user interface may additionally or alternatively receive second user input to select the first of the plurality of icons corresponding to first of the plurality of zones, and the second user input may include a second input type that is different than the first preprogrammed or preconfigured input type of the first user input. Responsive to receiving the second user input, the user interface may display a detailed information screen, programming screen, and/or configuration screen for the first of the plurality of zones.

In some embodiments, the first preprogrammed or preconfigured input type of the first user input may include an initial press and a subsequent hold of the first of the plurality of icons, and in some embodiments, the user interface may display the respective context image for the first of the plurality of zones simultaneously with and throughout a duration of the hold of the first of the plurality of icons. For example, the user may attempt to locate the first of the plurality of zones for programming or other related control functions and identify the first of the plurality of icons as potentially being associated with the first of the plurality of zones. The user may then provide the first user input to the user interface by initially pressing and subsequently holding the first of the plurality of icons. When the user interface identifies receipt of the first preprogrammed or preconfigured input type of the first user input type and receives the hold of the first of the plurality of icons after the initial press of the first of the plurality of icons, the user interface may display the respective context image for the first of the plurality of zones superimposed over at least a portion of or all of the user interface. In some embodiments, the user interface may display a semi-transparent view of the first of the plurality of icons corresponding to the respective context image for the first of the plurality of zones while the respective context image for the first of the plurality of zones is displayed on the user interface.

In some embodiments, the respective context image for the respective one of the plurality of zones may include a respective ambient image captured from a respective location of the respective one of the plurality of zones within a region protected by the security system or being controlled by the home automation system. For example, the user interface may receive the respective context image for the respective one of the plurality of zones from a respective image capturing device that captured the respective ambient image from the respective location of the respective one of the plurality of zones. In some embodiments, during initial setup of each of the plurality of zones, the user interface may solicit third user input assigning the respective context image to the respective one of the plurality of zones. Furthermore, in some embodiments, the respective image capturing device may include a mobile device (e.g. smart phone, tablet, handheld electronic device, etc.) paired with the user interface, and the mobile device may include a dedicated downloadable or web-based application that instructs the mobile device to capture the respective context image and directly uploads the respective context image to the user interface. In some embodiments, the mobile device may capture the respective context image in response to commands received from the user interface.

In some embodiments, the user interface may receive a respective alert message from the respective one of the plurality of zones and may display an indicator of the respective alert message on the user interface alongside the respective context image for the respective one of the plurality of zones. In some embodiments, at least one respective sensor or device associated with the respective one of the plurality of zones may transmit the respective alert message to the user interface when the at least one respective sensor or device detects a respective alert condition.

In some embodiments, the control panel may be coupled to the user interface and to each of the plurality of zones. Additionally or alternatively, in some embodiments, the control panel or the user interface may be directly connected to the devices or the sensors within each of the plurality of zones, and each of the devices or sensors may be associated with a respective one of the plurality of icons and the respective context image for a respective one of the devices or sensors. The control panel may process signals received from each of the plurality of zones, devices, or sensors and identify a type of user input received at the user interface.

FIG. 1 is a block diagram of a security system or a home automation system 20 in accordance with disclosed embodiments. As shown in FIG. 1, the system 20 may include a control panel 22, a user interface 24 coupled to the control panel 22, a plurality of zones 26, and a plurality of devices or sensor 28 connected to the control panel 22 and associated with the plurality of zones 26.

Figure 2:
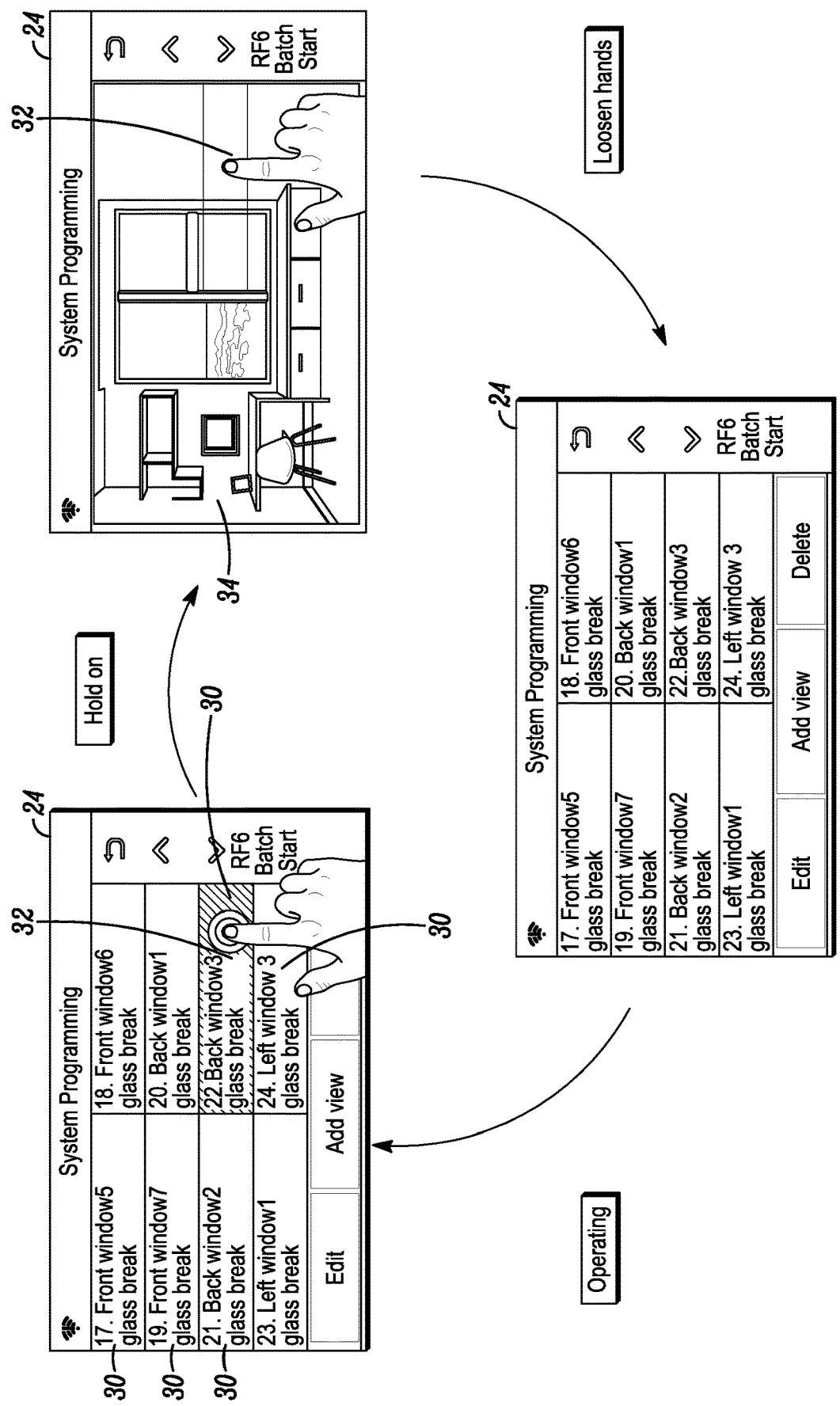
FIG. 2 is flow diagram of a method in accordance with disclosed embodiments.

FIG. 2 is flow diagram of a method in accordance with disclosed embodiments. As shown, the user interface 24 may display a plurality of icons 30 corresponding to at least some of the plurality of zones 26 or at least some of the plurality of devices or sensors 28. The user interface 24 may receive first user input 32 that includes an initial press followed by a subsequent hold of one of the plurality of icons 30 and, responsive thereto, identify one of the plurality of zones 26 or one of the plurality of devices or sensors 28 associated with the one of the plurality of icons, identify a respective context image associated with the one of the plurality of zones 26 or the one of the plurality of devices or sensors 28, and display the respective context image 34 associated with the one of the plurality of zones 26 or the one of the plurality of devices or sensors 28. When the subsequent hold of the one of the plurality icons 30 ends, the user interface 24 may cease displaying the respective context image 34 associated with the one of the plurality of zones 26 or the one of the plurality of devices or sensors 28.

Figure 3:
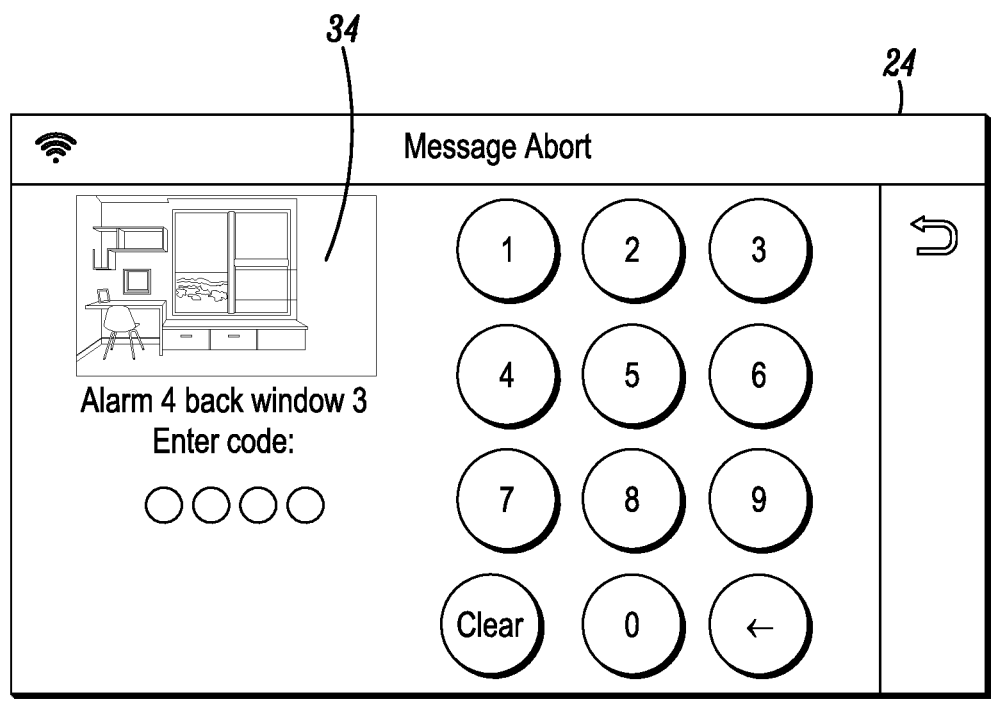
FIG. 3 is a view of a screen of displayed on a user interface of a security system or a home automation system in accordance with disclosed embodiments.

FIG. 3 is view of a screen displayed on the user interface of the security system or the home automation system in accordance with disclosed embodiments. In some embodiments, the control panel 22 may receive a respective alert message from a respective one of the plurality of zones 26 and may display an indicator of the respective alert message on the user interface 24 alongside the respective context image 34 for the respective one of the plurality of zones. In some embodiments, a respective one of the plurality of devices or sensors 28 may transmit the respective alert message to the control panel 22 when the respective one of the plurality of devices or sensors 28 detects a respective alert condition.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   assigning a respective context image to represent each of a plurality of zones of a security or home automation system;
   displaying a list view of a plurality of icons corresponding to at least some of the plurality of zones on a user interface of the security or home automation system;
   receiving first user input selecting one of the plurality of icons, wherein the one of the plurality of icons corresponds to one of the plurality of zones;
   identifying an input type of the first user input;
   when the input type is a first preconfigured type, displaying the respective context image that represents the one of the plurality of zones on the user interface, wherein the user interface displays the respective context image that represents the one of the plurality of zones superimposed over at least a portion of the user interface and simultaneously with and throughout a duration of the first user input;
   when the input type is a second preconfigured type, displaying a detailed information screen for the one of the plurality of zones on the user interface; and
   when an alert message relating to one of the plurality of zones is received at the user interface, displaying at the user interface an indicator of the alert message alongside both an ambient image, captured from a location that represents the one of the plurality of zones to which the alert message relates, and a code entry request, wherein the ambient image, displayed alongside the indicator of the alert message and the code entry request, is a different size than the superimposed respective context image displayed when the input type is the first preconfigured type.

2. The method of claim 1 wherein the first preconfigured type includes an initial press and a subsequent hold of the one of the plurality of icons, and wherein the respective context image that represents the one of the plurality of zones includes an ambient image captured from a location of the one of the plurality of zones within a region protected by the security or home automation system.

3. The method of claim 2 further comprising:
receiving the respective context image that represents the one of the plurality of zones at the user interface from an image capturing device that captured the ambient image at the location of the one of the plurality of zones.

4. The method of claim 1 further comprising:
during an initial setup of each of the plurality of zones, soliciting second user input assigning the respective context image to each of the plurality of zones.

5. The method of claim 1 wherein the alert message is received at the user interface from the one of the plurality of zones.

6. The method of claim 5 further comprising:
receiving the alert message at the user interface from at least one sensor associated with the one of the plurality of zones when the at least one sensor detects an alert condition.

7. The method of claim 1 wherein when the subsequent hold of the one of the plurality icons ends, the user interface ceases displaying the respective context image associated with the one of the plurality of zones.

8. The method of claim 1, wherein the user interface is included at a control panel of the security or home automation system.

9. The method of claim 1, wherein a mobile device is in communication with the security or home automation system, and wherein the mobile device includes a downloadable or web-based application for communication with the security or home automation system.

10. A system comprising:
a user interface of a security or home automation system; and
a plurality of zones of the security or home automation system,
wherein each of the plurality of zones is assigned a respective context image to represent a respective one of the plurality of zones,
wherein the user interface displays a list view of a plurality of icons corresponding to at least some of the plurality of zones, receives first user input selecting one of the plurality of icons, and identifies an input type of the first user input,
wherein the one of the plurality icons corresponds to one of the plurality of zones,
wherein, when the input type is a first preconfigured type, the user interface displays the respective context image that represents the one of the plurality of zones, wherein the user interface displays the respective context image that represents the one of the plurality of zones superimposed over at least a portion of the user interface and simultaneously with and throughout a duration of the first user input,
wherein, when the input type is a second preconfigured type, the user interface displays a detailed information screen for the one of the plurality of zones, and
wherein, when an alert message relating to one of the plurality of zones is received at the user interface, the user interface displays an indicator of the alert message alongside both an ambient image, captured from a location that represents the one of the plurality of zones to which the alert message relates, and a code entry request, alongside both an ambient image, captured from a location that represents the one of the plurality of zones to which the alert message relates, and a code entry request, wherein the ambient image, displayed alongside the indicator of the alert message and the code entry request, is a different size than the superimposed respective context image displayed when the input type is the first preconfigured type.

11. The system of claim 10 wherein the respective context image that represents the one of the plurality of zones includes an ambient image captured from a location of the one of the plurality of zones within a region protected by the security or home automation system.

12. The system of claim 11 wherein the user interface receives the respective context image that represents the one of the plurality of zones from an image capturing device that captured the ambient image at the location of the one of the plurality of zones.

13. The system of claim 10 wherein, during an initial setup of each of the plurality of zones, the user interface solicits second_user input assigning the respective context image to each of the plurality of zones.

14. The system of claim 10 wherein the alert message is received at the user interface from the one of the plurality of zones.

15. The system of claim 14 wherein the user interface receives the alert message from at least one sensor associated with the one of the plurality of zones when the at least one sensor detects an alert condition.

16. The system of claim 10 wherein when the subsequent hold of the one of the plurality icons ends, the user interface ceases displaying the respective context image associated with the one of the plurality of zones.

17. A system comprising:
a user interface of a home automation system; and
a plurality of devices connected to the home automation system,
wherein each of the plurality of devices is assigned a respective context image to represent a respective one of the plurality of devices,
wherein the user interface displays a list view of a plurality of icons corresponding to at least some of the plurality of devices, receives first user input selecting one of the plurality of icons, and identifies an input type of the first user input,
wherein the one of the plurality icons corresponds to one of the plurality of devices,
wherein, when the input type is a first preconfigured type, the user interface displays the respective context image that represents the one of the plurality of devices, wherein the user interface displays the respective context image that represents the one of the plurality of devices superimposed over at least a portion of the user interface and simultaneously with and throughout a duration of the first user input,
wherein, when the input type is a second preconfigured, the user interface displays a detailed information screen for the one of the plurality of devices, and
wherein, when an alert message relating to one of the plurality of zones is received at the user interface, the user interface displays an indicator of the alert message alongside both an ambient image, captured from a location that represents the one of the plurality of zones to which the alert message relates, and a code entry request, wherein the ambient image, displayed alongside the indicator of the alert message and the code entry request, is a different size than the superimposed respective context image displayed when the input type is the first preconfigured type.

18. The system of claim 17 wherein the respective context image that represents the one of the plurality of devices includes an ambient image of the one of the plurality of devices captured from a location of the one of the plurality of devices within a region under control of the home automation system.

19. The system of claim 18 wherein the user interface receives the respective context image that represents the one of the plurality of devices from an image capturing device that captured the ambient image at the location of the one of the plurality of devices.

20. The system of claim 17 wherein when the subsequent hold of the one of the plurality icons ends, the user interface ceases displaying the respective context image associated with the one of the plurality of zones.

\* \* \* \* \*